UNITED STATES PATENT OFFICE.

HENRY PARKES, OF TAMWORTH ROAD, GRAVELLY HILL, NEAR BIRMINGHAM, COUNTY OF WARWICK, ENGLAND.

MANUFACTURE OF NITRO-CELLULOSE.

SPECIFICATION forming part of Letters Patent No. 265,337, dated October 3, 1882.

Application filed November 21, 1881. (No model.) Patented in England May 10, 1879, No. 1,865; in France September 2, 1879, No. 132,495, and in Belgium November 14, 1881, No. 56,230.

*To all whom it may concern:*

Be it known that I, HENRY PARKES, a subject of the Queen of Great Britain, residing at Tamworth Road, Gravelly Hill, near Birmingham, in the county of Warwick, England, have invented certain new and useful Improvements in the Manufacture of Compounds of Nitro-Cellulose, applicable for making billiard-balls, combs, brush-backs, knife-handles, varnishes, and for dental purposes and a variety of other uses, (for which I have received Letters Patent in England, No. 1,865, dated 10th May, 1879; in France, No. 132,495, dated September 2, 1879, and in Belgium, No. 56,230, dated November 14, 1881;) and I do hereby declare that the following is a full, clear, and exact description of the invention, which will enable others skilled in the art to which it appertains to make and use the same.

This invention has for its object improvements in the manufacture of compounds of nitro-cellulose, applicable for making billiard-balls, combs, brush-backs, knife-handles, piano-keys, blocks for engraving, printing, or stereotyping, or for dental purposes or varnishes, and a variety of other uses.

I employ for the purpose of my invention nitro-cellulose, such as is now largely used in the manufacture of parkesine or celluloid, and which nitro-cellulose may be made either from paper, cotton, woven or other suitable material. This nitro-cellulose I in some cases, especially when delicate colors are desired, cause to be dyed, or bleached and dyed, before treatment with solvent. The bleaching and dyeing operations are conducted as is usual in bleaching and dyeing cotton. I employ by preference dyes which are soluble in the solvent I intend to employ in order to dissolve the nitro-cellulose or convert it into a moldable plastic mass. I soften or dissolve the nitro-cellulose by means of a solvent made with tetra-chloride of carbon and camphor, by adding camphor to the tetra-chloride of carbon in the proportion of one hundred parts of camphor to one hundred parts of tetra-chloride of carbon. This new combination will dissolve nitro-cellulose, especially when aided by heat and pressure. This new solvent may, if desired, be combined with other solvents of nitro-cellulose, and with gums, resins, oils, or other materials. In this manner I obtain a liquid solution, or a mass capable of being molded, as is well understood; and I also sometimes employ a solvent composed of bisulphide of carbon and camphor. The bisulphide of carbon should be saturated with camphor; and to convert the nitro-cellulose it is employed under heat and pressure, as is well understood. I also sometimes prepare a solvent of nitro-cellulose obtained by dissolving camphor in liquid sulphurous acid, or by passing sulphurous-acid gas through granulated camphor until the camphor is dissolved by combination with the sulphurous acid, forming a brilliant fluid which is a powerful solvent of nitro-cellulose. The sulphurous acid is easily removed in the after manipulation of the nitro-cellulose compound, leaving it free from any unpleasant odor. With the new solvent other solvents may be used, such as alcohol, spirits of wine, wood-naphtha, (purified,) ether, benzoline, or gasoline.

If it is desirable to color the nitro-cellulose, I prefer to dye it before it is softened or dissolved or partially dissolved with such coloring-matters as are soluble in the solvent of nitro-cellulose employed. By this means very pure shades of color are produced. When alcohol is employed coloring-matters may be added to the alcohol, before using it, to soften or dissolve the nitro-cellulose. The preparation may also be combined with pigments or other coloring-matters, or with oils, gums, or resins, &c.; and it can be made into sheets or other forms. When finished it is free from smell, and is hard and elastic to a high degree, and more suitable than any other combination of nitro-cellulose for a great variety of articles where camphor is objectionable.

Having thus described the nature of my said invention and the manner of performing the same, I would have it understood that I claim as my invention for the manufacture of plastic or moldable compounds of nitro-cellulose—

1. Dyeing the nitro-cellulose and afterward dissolving it or softening it and causing it to cohere by means of a solvent.

2. The employment, to dissolve or soften the nitro-cellulose, of tetra-chloride of carbon, together with camphor.

3. The employment, to dissolve or soften the nitro-cellulose, of bisulphide of carbon, together with camphor.

4. The employment, to dissolve or soften the nitro-cellulose, of sulphurous acid, together with camphor.

HENRY PARKES.

Witnesses:
  W. H. HARRIS,
    *Notary Public, Birmingham.*
  F. BAXTER,
    *His clerk.*